United States Patent Office 3,313,676
Patented Apr. 11, 1967

3,313,676
OUTDOOR DECORATIVE LAMINATE
Musa Rasim Kamal, Stamford, and James Sterling Noland, Greenwich, Conn., assignors to Formica Corporation, Cincinnati, Ohio, a corporation of Delaware
No Drawing. Filed Jan. 23, 1964, Ser. No. 339,616
8 Claims. (Cl. 161—189)

This invention relates to novel unitary heat- and pressure-consolidated decorative laminated articles and to processes for preparing such articles.

More particularly, this invention relates to novel heat- and pressure-consolidated thermoset resin-bonded multilayer decorative laminates suitable for outdoor use wherein the decorative surface comprises a print sheet member overlaid with a substantially transparent polyvinyl fluoride film bonded directly to said print sheet member by means of a thermoset resin, which in its uncured state is a curable resinous composition comprising a self-crosslinking, normally solid, non-crystalline adhesive polyester resin composition prepared by esterifying (1) from about 34–49 mol percent of a cycloaliphatic dihydric alcohol, (2) from about 1–16 mol percent of an asymmetrical, linear aliphatic dihydric alcohol, (3) from about 30–49 mol percent of an $\alpha,\beta$-ethylenically unsaturated dicarboxylic acid selected from the group consisting of fumaric acid and itaconic acid and (4) from about 1–20 mol percent of a cycloaliphatic dicarboxylic acid, wherein the total mol percent of all components is 100%.

The many commercially available varieties of polymeric fluorocarbon films have made possible substantially transparent surfacing materials which are resistant to the extremes of weather conditions in outdoor applications such as finishes for metals, fibrous materials, and plastics in architectural, decorative, or industrial structures. Polyvinyl fluoride is an example of a fluorocarbon film which has enjoyed wide acceptance due to its ability to maintain toughness and flexibility over wide ranges of temperature and other conditions of outdoor use. Moreover, such films are resistant to chemicals and common solvents, maintain the necessary level of hydrolytic stability, and are available in an unpigmented, substantially transparent form.

In order to display an underlying decorative pattern as well as to obtain the foregoing properties, it is important that a firm bond be achieved between the substantially transparent polyvinyl fluoride surface layer and the print sheet member. For this purpose, there have been suggested various transparent adhesive resins of the epoxy, acrylic, and polyester type. However, despite the generally excellent bond achieved by the use of the foregoing types of adhesive resins when used to bond pigmented or opaque type polyvinyl fluoride films to decorative print sheet members or other substrate materials, there remains a need for an adhesive agent which will effectively bond the substantially transparent grade of polyvinyl fluoride film to decorative print sheet members employed in weather-resistant decorative laminated articles.

One of the objects of the present invention is to provide a weather-resistant decorative laminated article having a substantially transparent top film of a polymeric fluorocarbon which is tightly bonded to an underlying print sheet member such that the entire assembly when heat- and pressure-consolidated with a rigidity-imparting base member, will be useful in a wide range of outdoor architectural, decorative, and industrial applications. A further object of this invention is to provide a process for preparing a unitary weather-resistant decorative laminated article having the aforementioned composition and properties. These and other objects of the present invention will be discussed in greater detail hereinbelow.

In accordance with this invention, these objects are achieved by a unitary heat- and pressure-consolidated weather-resistant decorative laminated article which comprises (I) a rigidity-imparting base member, (II) a print sheet member bonded to said base member and coated with a substantially completely cured composition which, in its uncured state, is a curable, adhesive polyester resin comprising the esterification product of (A) from about 34 to 49 mol percent of a cycloaliphatic dihydric alcohol, (B) from about 1 to 16 mol percent of an asymmetrical, linear aliphatic dihydric alcohol, (C) from about 30 to 49 mol percent of an $\alpha,\beta$-ethylenically unsaturated dicarboxylic acid selected from the group consisting of fumaric acid and itaconic acid, and (D) from about 1 to 20 mol percent of a cycloaliphatic dicarboxylic acid, wherein the total mol percent of all components is 100%, and (III) a substantially transparent film of adherable polyvinyl fluoride, an adherable side of which is directly bonded to said print sheet member by means of said adhesive mixture.

The polyvinyl fluoride film employed in the practice of this invention is a commercially available material having a thickness of from about 0.5 to 4 mils. The particular grade of film is that which is clear or substantially transparent, i.e., a film which is nonpigmented. In addition, the polyvinyl fluoride film must be pre-treated to render at least one side thereof adherable. By "adherable" is meant any condition imposed on a surface of the film by various physical or chemical techniques to render the surface of the film susceptible to bonding with conventional substrates, among which are included cellulosic materials, e.g., wood, paper, fiber board, and the like; metals, e.g., galvanized steel, aluminum, and the like; flexible plastics, felts, papers, and the like; as well as conventional thermoplastics and thermosetting resinous surfaces.

Methods of manufacturing polyvinyl fluoride films useful in the present invention are well known in the art and therefore need not be described herein. One such method is that of U.S. Patent 2,953,818, herein incorporated by reference. The various treatments used to render one or both surfaces of polyvinyl fluoride films adherable are also known in the art, e.g., Belgian Patents 610,318, 619,638 and 620,723.

Thus, in Belgian Patent 619,638 there is described a method of making one side of a polyvinyl fluoride film adherable without affecting the non-adherability of the other side by passing the film around an electrically grounded rotating drum while the outer face is electrically charged by passage close to a D.C. electrode, causing the film to adhere strongly to the drum. The film is next passed a certain distance from a set of tubular electrodes carrying an A.C. current. Nitrogen is flowed through the tubes and into the space between the electrodes and the drum. The film is then conducted away from the grounded drum. Belgian Patent 620,723 is a variation on the foregoing process and involves exposing the films of polymerized fluorinated hydrocarbons to an electric discharge in an atmosphere having a limited moisture content by passing the film around a grounded rotating drum serving as the negative electrode, with one or more positive electrodes affixed a certain distance from the drum and parallel to its axis of rotation. During this treatment, the atmosphere having limited moisture content is constantly renewed through outlets near the electrodes. For further details see the aforementioned Belgian patents which are herein incorporated by reference.

A convenient method for determining whether a surface of a polyvinyl fluoride film is adherable for the purposes of the present invention is to compare the behavior of an unknown film (X) to the behavior of a film (N)

which is known to be nonadherable. Both films are cleaned with a cloth saturated with a solution of 30% by weight n-propyl alcohol in water. After allowing the film to dry, a drop of the same solution is squeezed from an eye dropper onto the surface of each film. If the film (X) is adherable, the drop will spread at a rate approximately twice as fast as that on film (N), i.e., the area covered by the drop on film (X) will be twice the area covered on film (N) over the same space of time. For example, after about 10–20 seconds from the time of application of the drop, if both films are nonadherable the drops will spread at approximately the same rate in each application.

Substantially transparent polyvinyl fluoride films treated to impart adherability on one or both sides may be used. When a film with a single adherable side is employed, the adherable side will, of course, be the side which is bonded to the print sheet member.

Conventional print sheet members are used to form the decorative laminated article of this invention. Among the suitable materials are cellulosic substances, such as high grade, absorbent, regenerated α-cellulose paper which has been printed with a design or dyed or pigmented to impart a solid color thereto. Another useful print sheet material is a sheet of fibrillated wet-spun filaments of a polymer of acrylonitrile. These acrylic fiber sheets are known in the paper making art, for example, U.S. Patents 2,810,646 and 3,047,455. Other materials are kraft paper, cotton fabrics, linen fabric, glass fiber fabric, polyester resin fibers, linear superpolyamide fibers, and the like. Printed designs having an unlimited range or form of artistic effect may be employed, so long as the inks or other coloring matter contained therein are nonbleeding in the curable resinous compositions with which the sheet is subsequently saturated and/or coated. It should be noted that these inks or colorants will preferably be resistant to fading under outdoor conditions. In addition, the filaments making up the print sheets may contain minor amounts of such materials as are normally present in textile fibers, e.g., delusterants, antistatic agents, and the like, while the print sheets themselves may also contain minor amounts of any of the softening agents, sizes, coating materials and the like commonly employed in the manufacture of paper.

The print sheet members may be used as such or they may be preimpregnated with known aminotriazine-aldehyde thermosetting resins. These resins as well as techniques for their preparation are shown for example in U.S. Patent Nos. 2,197,357 to Widmer et al. and 2,260,239 to Talbot. These are synthetic resins wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di-, and tri-substituted melamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldehyde to aminotriazine be within the order of from about 1.5:1 to about 3:1, respectively.

Conventional reaction conditions are observed in preparing the thermosetting aminotriazine-aldehyde resin. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3'-iminobispropylamine and the like, may also be used to effect alkaline reaction conditions. When necessary, acidic substances such as hydrochloric acid, sulfuric acid, phosphoric acid, acetic acid, and the like, or salts thereof may also be employed to regulate the pH.

If desired, the thermosetting aminotriazine-aldehyde resin may be modified by the addition thereto of plasticizers such as α-alkyl-D-glucosides, e.g., α-methyl-D-glucoside, as disclosed in U.S. Patent No. 2,773,848 to Lindenfelser, methylol derivatives of sulfonamides, e.g., N-methylol-p-toluenesulfonamide (which may be formed in situ by the addition of p-toluenesulfonamide to the aminotriazine-aldehyde reaction mixture), or combinations of these glucosides and methylol sulfonamides, as disclosed in U.S. Patent No. 2,773,788 to Magrane et al. In addition, the thermosetting aminotriazine-aldehyde resin may also contain curing catalysts, such as phosphoric acid, phthalic acid, p-toluenesulfonic acid, mixtures of alkyl alkylol tertiary amines, e.g., diethylethanolamine, with acids, e.g., acetic acid, and the like although in most cases uncatalyzed resin will be preferred.

When the print sheet member is preimpregnated with the aminotriazine-aldehyde resin, conventional impregnating conditions and amounts are employed. Thus, the print sheet will be impregnated with from about 35% to 65% by weight, preferably from about 40% to 50% by weight, based on the total dry weight of the impregnated sheet, of the curable resinous composition. Following impregnation, the sheet will be dried at a temperature high enough so that substantially all of the moisture will be driven off but not so high that the curable resinous impregnant will be too far advanced in cure, i.e., to the point at which this resinous reaction mixture will not exhibit satisfactory flow under the relatively high pressure encountered in the subsequent laminating step. A preferred method of drying and partially advancing the curable resinous composition on the print sheet involves a single step wherein the impregnated print sheet is dried at a temperature ranging from about 80° C. to about 150° C. for from about 20 to 5 minutes, low temperatures corresponding to longer times and vice versa, although the same results may be accomplished in several steps as well.

The curable adhesive polyester resin used to impregnate and coat the print sheet member (or only to coat if the print sheet has been preimpregnated with an aminotriazine-aldehyde resin) is a self-cross-linkable, normally solid, non-crystalline adhesive polyester resin comprising the esterification product of (1) from about 34 to 49 mol percent of a cycloaliphatic dihydric alcohol, (2) from about 1 to 16 mol percent of an asymmetrical, linear aliphatic dihydric alcohol, (3) from about 30 to 49 mol percent of an $\alpha,\beta$-ethylenically unsaturated dicarboxylic acid selected from the group consisting of fumaric acid and itaconic acid and (4) from about 1 to 20 mol percent of a cycloaliphatic dicarboxylic acid, wherein the total mol percent of all components is 100%.

Illustrative of cycloaliphatic dihydric alcohols of component (1) of the polyester resin are cyclohexanediol-1,2; cyclohexanediol-1,3; cyclohexanediol-1,4; cyclohexanedimethanol-1,2; cyclohexanedimethanol-1,3; cyclohexanedimethanol-1,4; cyclohexanediethanol-1,4; hydrogenated bis-phenol A [further identified as isopropylidinebis (p-hydroxycyclohexane)], and the like. The hydroxy groups in the hydrogenated bisphenol A are generally in the p,p' position when scured from commercial sources. Additionally, one may use the hydrogenated bisphenols such as those disclosed in the U.S. Patent 2,118,954. These cycloaliphatic dihydric alcohols may be used either singly or in combination with one another in the compositions of the present invention but the requirement with respect to the mol percent ratio is still applicable whether one or more cycloaliphatic dihydric alcohols are used.

Illustrative of an asymmetrical linear aliphatic dihydric alcohol of component (2) are 1,3-butylene glycol, 1,2-butylene glycol, pentanediol-1,2, pentanediol-1,3, pentanediol-1,4, hexanediol-1,3, hexanediol-1,5, octanediol-1,6, octanediol-2,5, and the like. These asymmetrical dihydric alcohols may be used either singly or in combination with one another but the proportion requirement remains the same in either event.

The $\alpha,\beta$-ethylenically unsaturated dicarboxylic acids of component (3) may be used either separately or in combination with one another and the proportion requirement remains the same. However, when itaconic acid is used as the $\alpha,\beta$-ethylenically unsaturated dicarboxylic acid, the measure of the asymmetrical dihydric alcohol may be diminished proportionately if desired, since itaconic acid is in itself asymmetrical and it is the lack of symmetry in the glycol and/or in the itaconic acid which aids in producing the non-crystalline characteristic in the polyester resin composition of the present invention.

Among the cycloaliphatic dicarboxylic acids which may be used in the adhesive polyester resin as component (4) are hexahydroorthophthalic acid, hexahydrometaphthalic acid, hexahydroparaphthalic acid, and the like. These and comparable acids may be used either singly or in combination with one another but the mol percent range still prevails whether used singly or jointly.

It is to be noted that the total amount of the first two components of the adhesive polyester resin, namely the two dihydric alcohol materials, should total approximately 50 mol percent in the ultimate polyester resin composition produced. Analogously, the two dicarboxylic acid components should total approximately 50 mol percent, based on the total polyester resin composition. The total of the various four components should, of course, add up to 100%. In the preparation of the adhesive polyester resins, it will be desirable to use a small excess amounting to about 5 or 10% of the dihydric alcohol components, based on stoichiometrical calculations required to achieve substantially complete esterification, but the excess dihydric alcohol materials used remains unreacted at the completion of the process and do not enter into the final composition and are preferably stripped off to yield a normally solid, non-crystalline, self-cross-linkable polyester resin composition.

The term "self-cross-linkable" as used in the description of the adhesive polyester resin refers to the capability of the unsaturated polyester resins to cross-link with themselves without benefit of a cross-linking monomer such as styrene, methyl methacrylate, diallylphthalate and the like. It obviously does not preclude the use of a free radical producing catalyst such as those described elsewhere herein since it is desired to make use of such catalyst to facilitate the cross-linking of these polyester resin compositions.

The unsaturated polyester resins can be and preferably are used without benefit of a polymerizable monomer as adhesives in the weather-resistant decorative laminated articles of this invention. However, one could utilize any of the conventional cross-linking agents used generally with unsaturated polyester resins for purposes other than outdoor vertical laminate purposes. Among the polymerizable monomers frequently used in this connection with the unsaturated polyester resins generally are styrene, ring-substituted alkyl and halo styrenes, and allyl monomers such as diallyl maleate, diallyl phthalate, triallyl cyanurate and the like. Since this approach is well known in the art it is deemed sufficient to make reference to the U.S. Patents 2,255,313, 2,443,735–41, inclusive, 2,510,503, and 2,510,564 and to incoroporate the same herein by reference. Since the conventional cross-linking agents are generally solvents for the self-cross-linkable polyester resin, the term "organic solvent" is used herein to include these cross-linking agents and the inert organic solvent vehicles for the polyester resin which are described hereinafter, as well as mixtures of the cross-linking agents and inert organic solvents.

In utilizing the self-cross-linkable polyester resins as adhesive materials in the preparation of the laminated articles of this invention, the polyester resin is first dissolved in a conventional cross-linking agent or suitable inert organic solvent such as benzene, toluene, xylene, chloroform, ethylene dichloride, trichloroethylene, nitromethane, dimethylformamide, and the like. Once dissolved in these solvents, or mixtures thereof, the solution may be utilized by addition thereto, just prior to use, of catalytic quantities of conventional peroxide catalysts normally used for this general purpose. Included in the group of catalysts suitable for this purpose are benzoyl peroxide, tertiary butyl hydroperoxide, ditertiary butyl peroxide, cumene hydroperoxide, 1-hydroxy cyclohexyl peroxide-1, and the like. The aliphatic peroxides are particularly preferred. Combinations of catalysts and accelerators can be used if desired. The amount of catalyst used may be varied from about 0.1% and 10% by weight based on the total weight of the resin solids and preferably between about 1 and 3%, same basis. The use of a catalyst can be avoided by using thermopolymerization conditions but best results are achieved by the combination of thermal and catalytic conditions.

Any conventional method, e.g., dip-, brush-, flow-, roller- or spray coating, can be used in coating the print sheet member with the organic solution of the self-cross-linking, normally solid, non-crystalline adhesive polyester resin of this invention. When the print sheet has not been preimpregnated with the aminotriazine-aldehyde resin, it will be impregnated and coated with from about 35% to about 65% by weight, and preferably from about 40% to about 50% by weight, based on the total dry weight of the impregnated sheet, of the adhesive polyester resin in an organic solvent. The desired degree of impregnation and coating can be achieved by one or several treating passes and, as can be readily appreciated, where several passes are made the solids content of the impregnating solution can be low, while for one-pass operations higher solids contents will be required.

Where the print sheet has been preimpregnated with an aminotriazine-aldehyde resin, less of the adhesive polyester resin will be required on the surface of the print sheet. A coating of from about 5 to 20 grams per sq. ft., preferably 7 to 15 grams per sq. ft., based on the weight of dry polyester resin, will be adequate to provide adhesion of the print sheet to an adherable side of the substantially transparent polyvinyl fluoride top film. In any case, whether or not the print sheet has been preimpregnated, the amount of adhesive polyester resin will be that quantity necessary to achieve a tight bond between the polyvinyl fluoride top film and print sheet and obviously may vary within wide limits depending on choice of print sheet and polyester resin solids content of the coating solution.

Following impregnation and/or coating, the print sheet will be dried at a temperature high enough so that substantially all of the inert organic solvent will be driven off and yet low enough so that the adhesive polyester resin will not be substantially advanced in cure, i.e., to the point at which this resinous reaction mixture will not exhibit satisfactory flow under the relatively high pressures encountered in the subsequent laminating step, and thus will not flow sufficiently to eliminate small pits, dents and other minor imperfections in the resinous layer. However, a certain amount of advancement is desirable prior to the time at which the entire laminating assembly is consolidated in a laminating press, inasmuch as this insures that the curable resinous composition will not be squeezed out of the print sheet member in the press before being substantially completely cured. Furthermore, since cross-linking takes place fairly rapidly at temperatures above about 100° C., it is evident that any desired degree of advancement in self-cross-linking can be accomplished either during the drying step, if drying is carried out at sufficiently elevated temperatures, or subsequent to the time at which the adhesive mixture-covered print sheet can be considered substantially dry, by an additional heating period at temperatures substantially above room temperature, if drying is carried out at relatively lower temperatures, e.g., room temperature.

A two-stage method of drying and partially advancing the curable resinous composition on the print sheet is preferred. The first, or drying stage, involves drying the treated sheet at a temperature ranging from about room temperature, i.e., about 25° C., to not more than about 150° C. for from about 30 seconds at the upper temperatures in this range to several hours, e.g., four hours or more, at the lower end of the range, depending, of course, on the solvent employed as well as the drying temperature. Preferably, drying will be accomplished by subjecting the impregnated sheet to a temperature of from about 80° C. to about 130° C. for from about 3 minutes to about 10 minutes. The second stage, during which the curable resinous composition on the substantially dry print sheet is partially advanced in cure, will be carried out at a temperature of from about 110° C. to about 150° C. for from about 2 minutes to about 10 minutes.

As previously indicated, drying and partial advancement of the curable resinous composition used to treat the print sheet can also be carried out in one step rather than in separate stages. However, care must be taken to avoid heating the coated sheet to the point at which the inert organic solvent being given off causes bubbling, since this can cause discontinuity, which in turn leads to poor bonding, particularly if, at the same time, the curable resinous composition is advanced to the point at which its flow under the relatively high pressures applied in the subsequent laminating step will be substantially diminished. Thus, one step drying (coupled with partial advancement) will preferably be carried out at a temperature ranging from about 80° C. to about 150° C. for from about 5 minutes to about 20 minutes, the lower temperature corresponding to the longer time, and vice versa.

An alternative procedure would be to coat an adherable side of the polyvinyl fluoride surface film with the curable adhesive polyester resinous mixture, partially advance the cure of the resin, and then proceed with the heat- and pressure-consolidation step to bond the overlay film to the print sheet and print sheet to rigidity-imparting base member. This procedure is preferred when the print sheet member has been preimpregnated with an amino-triazine-aldehyde resin.

Any of a plurality of conventional materials can be employed as the base or core member in the novel laminated articles of this invention. This is due primarily to the fact that the base member cannot be seen when the laminate is in use, and also because this part of the laminate is not subjected to the same degree of wear as the decorative surface. The base member functions to impart rigidity to the laminate, and comprises a solid substrate which may or may not be formed prior to the initial laminating step, e.g., a plurality of sheets of kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as an epoxy-polyamine resin-treated cement-asbestos board, sheet rock, plaster board and the like, or a combination of these substrates, e.g., a combination of a plurality of phenolic resin-impregnated kraft paper sheets over a piece of cement-asbestos board, particle board, or the like.

One highly suitable class of base members comprises the aforementioned phenolic resin-impregnated paper base members. Such base members are preferably united with the print sheet member and the clear, protective top film by employing, as the bottommost member of an individual laminating assembly, one or more sheet or plies of a low-cost kraft paper, creped kraft paper, or both, which have been impregnated with the least amount of a thermosetting phenolic resin capable of providing a good bond in the core assembly, e.g., amounts of phenolic resin ranging from about 25% to about 40% by weight, based on the total dry weight of the impregnated paper.

Ordinarily, from about 5 to about 8 sheets of phenolic resin-impregnated paper will be used, thereby providing a base member which, in the finished laminate, will usually be at least about one sixteenth of an inch thick. It should be noted, however, that laminates of this type wherein the thickness of the entire assembly of the top film, print sheet and base members is as litle as about one thirty-second of an inch or less, as obtained, for example, by using fewer phenolic resin-impregnated sheets in the base member, can be prepared and are suitable for many uses. Thus, neither the number of sheets of paper, the amount of phenolic resin, nor the thickness ultimately achieved in a base member of this type is critical. However, it has been found that a thickness of at least one sixteenth of an inch is especially desirable when the laminate is consolidated, either during the initial laminating step by means of heat and pressure or afterwards by adhesive bonding, with an additional solid or precured substrate of the type mentioned hereinabove, e.g., a piece of asbestos-cement board, particle board, or the like, in the phenolic resin-impregnated paper base members having at least this minimum thickness are better able to relieve or take up stresses produced by these additional substrates, certain of which are relatively dimensionally unstable, thereby preventing cracking or crazing on the decorative surface of the laminate. It has also been found that even where no phenolic resin-impregnated paper base member is used, the thickness of the solid substrate used in its place should be at least about one sixteenth of an inch for the same reason, with the thickness of any particular solid substrate chosen being correlated with its density whereby said substrate is adapted to retain its form under moderate stress. The maximum thickness of any of the base members in question is governed by practical considerations, e.g., cost, availability, where and how the finished laminate is to be used, and so forth.

The thermosetting phenolic resins used to impregnate a base or core member comprising one or more sheets of kraft or creped kraft paper are well known in the art as shown, for example, in U.S. Patents Nos. 2,205,427, 2,315,087 and 2,328,592, among others, which are incorporated herein by reference. These resins are conventionally obtained by reacting a phenolic substance such as phenol itself, substituted phenols, e.g., alkyl phenols such as cresols, xylenols, tertiary alkyl phenols, and the like, or mixtures of such phenolic substances, with an aldehyde such as formaldehyde, acetaldehyde, propionaldehyde, benzaldehyde, furfural, and the like, or with mixtures of such aldehydes, either alone or in the presence of other aldehyde-reactable substances, such as urea, thiourea, substituted ureas and thioureas, aminotriazines, e.g., melamine, lignin derivatives, and the like.

Conventional laminating techniques are employed in preparing laminates from the above-described base members, impregnated and/or coated print sheets, and substantially transparent top films. Thus, the adherable polyvinyl fluoride top film is placed with an adherable side against the curable adhesive polyester resin mixture-covered side of the print sheet member or, where the polyvinyl fluoride top film is coated with the adhesive resin on an adherable side, said film is placed with its coated side against the print sheet member. Then top film and print sheet are assembled with the base member, or plurality of sheets or boards constituting the base member, and inserted in a laminating press between laminating press plates, e.g., stainless steel press plates which may have finishes ranging from a mirror polish to a matte surface, either as a single assembly or as a multiple assembly of two or more of such single assemblies, and consolidated by means of heat and pressure into a unitary decorative structure. Besides laminates having only one decorative surface, balanced laminates wherein a mirror-image assembly of the decorative members is bonded to each side of a base or core member may also be prepared.

Temperatures ranging from about 135° C. to about 160° C., preferably from about 140° C. to about 150° C., and pressures ranging from about 150 p.s.i. to about 1500 p.s.i., will be employed. The particular pressure employed depends in large measure upon the nature of the base member and clear, protective top film employed. For example, where a conventional "low pressure" substrate, e.g., flakeboard, plywood, and the like, is used, pressures ranging from about 150 to about 350 p.s.i., and preferably from about 250 to about 300 p.s.i., will be used. Conversely, when a conventional "high pressure" substrate, e.g., a plurality of sheets of phenolic resin-impregnated paper and the like, is used, pressures ranging from about 600 to about 1500 p.s.i., and preferably from about 1100 to about 1200 p.s.i., will generally be employed. The time required to effect substantially complete cure of the resinous components of the assembly when employing temperatures and pressures within the above-stated ranges will usually be from about 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are set forth primarily for illustration, and should not be considered as expressing limitations unless so set forth in the appended claims. All parts and percentages are by weight, unless otherwise stated.

*Preparation of curable adhesive resins*

Adhesive polyester resins typical of the curable adhesive resins useful in the practice of the present invention may be prepared as follows:

*Adhesive resin A*

Into a suitable reaction vessel equipped with stirrer, thermometer, temperature controller, gas inlet tube (below the liquid surface), and a gas exit tube fitted with a steam condenser, there is introduced 247 parts of 1,3-butylene glycol, 792 parts of 1,4-cyclohexanedimethanol, 580 parts of fumaric acid, 385 parts of hexahydrophthalic anhydride and 2 parts of tertiary butyl catechol. The reactants are blanketed with a carbon dioxide atmosphere (200–300 cc./minute) and heated with constant stirring to about 195–200° C. until an acid number of about 15 is reached. The condenser is then removed and the inert gas rate is increased to about 10 liters/minute in order to remove the excess glycol. The sparging is continued until a sample of the resin has a hardness value of 38–40, as measured at 25° C. with a Barcol Model 936 "Impressor." The final acid number is 10.8. The finished resin is cooled to 170° C. and poured with stirring into sufficient toluene so as to prepare a 70% resin solids solution. Alternatively, the neat resin is poured directly into an aluminum tray and cooled to room temperature. The cooled resin is a glassy solid which is non-sticky to the touch but with a tendency to cold-flow.

*Adhesive resin B*

Into a suitable reaction vessel equipped as before there is introduced 54.9 parts of 1,3-butylene glycol, 190.2 parts of 1,4-cyclohexanedimethanol, 132.2 parts of fumaric acid, 87.7 parts of hexahydrophthalic anhydride and 0.45 part of tertiary butyl catechol. The procedure outlined in Example 1 was followed in all details except that the batch was heated at about 205° C. for about 20 hours under a blanket of nitrogen, introduced at a rate of 50 ft.³/hour. At the end of the 20 hour cook cycle, the acid number of the resin was about 15 and the Barcol Model 936 hardness of a sample was 40 at 25° C. without requiring the final sparging step. The finished adhesive resin B, in a 30% solids solution in dimethyl phthalate, has a Gardner-Holdt viscosity of U-V at 25° C., and the color is 1 on the Gardner color 1933 scale. The resin may then be drawn hot (180° C.) into a second stirred kettle containing sufficient toluene to prepare a 70% solids solution for further dilution to any desirable solids concentration.

*Adhesive resin C*

Into a suitable reaction vessel equipped as before, there is introduced 1585 parts of 1,4-cyclohexanedimethanol, 198 parts of 1,3-butylene glycol, 696 parts of fumaric acid, 616 parts of hexahydrophthalic anhydride, 262 parts of itaconic acid and 3 parts of tertiary butyl catechol. The batch is heated to 200° C. under a nitrogen blanket maintained at a rate of 300 cc./minute for a 21 hour period. At that time, the acid number of the resin is 12 and the Barcol hardness of a sample is 42 at 25° C. The finished resin is cooled to 170° C. and poured with stirring into sufficient toluene to make up a 70% resin solids solution.

EXAMPLE I

A solution consisting of 100 parts of adhesive resin B, 100 parts of toluene, 1.43 parts of 2,6 - ditertiarybutyl-peroxy - 2,6 - dimethylhexane, 0.57 part of tertiary-butylhydroperoxide, and 0.233 part of cobalt naphthenate (6% cobalt metal) was applied to the surface of a cellulosic print sheet which had been preimpregnated with a melamine-formaldehyde resin in the proportion 44 parts melamine-formaldehyde resin solids and 56 parts paper. A sufficient amount of the above resin solution was applied to obtain a surface film of 12 g./ft.² of dry resin.

The print paper, thus coated, was dried and the resin simultaneously advanced by treating at 130° C. for 5 minutes in a forced draft oven. This print sheet was then employed as the decorative member in a laminate consisting, from the bottom up, of 7 sheets of conventional phenolic resin-impregnated kraft paper, 1 sheet of a high flow phenolic adhesive paper for improved bonding, the subject print paper coated with the above solution of adhesive resin B, and a 1 mil thick polyvinyl fluoride film (adherable, non-pigmented, transparent)

with an adherable side toward the adhesive resin surface. This assembly was consolidated between mirror-finished stainless-steel platens at 1100 p.s.i. for 30 minutes at 170° C.

The resulting laminate withstood 5000 hr. exposure in a fluorescent-ultraviolet weatherometer without deterioration of the polyvinyl fluoride top film print sheet bond.

EXAMPLE II

An acrylic fiber sheet (67 lb. basis wt.) printed with a decorative pattern was impregnated with a solution consisting of 100 parts of adhesive resin B, 150 parts toluene, 1.33 parts 2,6 - ditertiarybutylperoxy - 2,6 - dimethylhexane, 0.67 part tertiarybutylhydroperoxide, and 0.278 part of cobalt naphthenate, and then dried for ten minutes at 113° C. in a forced draft oven. This dried sheet, containing about 45 parts dry resin to 55 parts acrylic fiber paper, was then given a surface coat of the adhesive resin solution of Example I and again dried for 10 minutes at 113° C. The proportion of total resin solids (impregnant and coating) to weight of acrylic fiber print paper was about 66 parts resin to 33 parts paper.

This sheet was then employed as the decorative member in a laminate consisting, from the bottom up, of 7 sheets of phenolic resin-impregnated kraft paper, 1 sheet of a high flow phenolic adhesive paper, the subject impregnated and coated acrylic print sheet, and a 1 mil thick polyvinyl fluoride film (adherable, non-pigmented, transparent) with the adherable side toward the adhesive resin. This assembly was then consolidated between stainless steel platens at 600 p.s.i. for 30 minutes at 160° C. The resulting laminate maintained a tight polyvinyl fluoride top film-print sheet bond after 4000 hours in an Atlas 60–WR Xenon weatherometer operated according to ASTM standard D1499–59T.

EXAMPLE III

A decorative laminate was prepared in the same manner as in Example II except that the bottom phenolic resin-impregnated kraft paper sheets were replaced with a ⅛ inch thick cement-asbestos board which had been previously sized with a 30% solution of a commercially available epoxy resin (diglycidyl ether of bisphenol A) dissolved in acetone. Said epoxy resin contains an 80% equivalent of n-phenylene diamine. In the same Xenon weatherometer test no delamination resulted after more than 4000 hours exposure, indicating a strong bond between the polyvinyl fluoride top film and print sheet member.

EXAMPLE IV

A cellulosic print paper was impregnated with a solution consisting of 100 parts of adhesive resin B, 200 parts of ethylene dichloride, 1.33 parts of 2,6 - dietertiarybutylperoxy - 2,6 - dimethylhexane, 0.67 part of t - butylhydroperoxide, and 0.278 part of cobalt naphthenate. The paper was dried for 10 minutes at 113° C. in a forced draft oven, given a surface application of the adhesive resin solution of Example I, and dried again for 10 minutes at 113° C. The proportion of total resin solids (impregnant and coating) to weight of cellulosic paper was about 62 parts resin to 38 parts paper. This print sheet was then employed as the decorative member in place of the melamine-formaldehyde print sheet in a laminate assembly prepared according to Example I. The resulting sample was exposed for 5000 hours in a fluorescent-ultraviolet weatherometer and for 6 months outdoors without degradation of the bond between the polyvinyl fluoride top film and the decorative print sheet member.

COMPARATIVE EXAMPLES

Attempts to permanently bond transparent adherable films of polyvinyl fluoride to the print sheets and base members of Examples I to IV failed when the resinous adhesive mixtures of these examples were replaced by certain commercially available resinous adhesives. Although a good initial bond was achieved in some cases, delamination (peeling away of the surface layer) occurred after less than 800 hours exposure in the weatherometer devices.

We claim:
1. A unitary, heat- and pressure-consolidated, weather-resistant decorative laminated article which comprises:
    (I) a rigidity-imparting base member,
    (II) a print sheet member bonded to said base member and coated with a substantially completely cured composition which, in its uncured state, is a curable, adhesive polyester resin comprising the esterification product of
        (A) from about 34 to 49 mol percent of a cycloaliphatic dihydric alcohol,
        (B) from about 1 to 16 mol percent of an asymmetrical, linear aliphatic dihydric alcohol,
        (C) from about 30 to 49 mol percent of an $\alpha,\beta$-ethylenically unsaturated dicarboxylic acid selected from the group consisting of fumaric acid and itaconic acid, and
        (D) from about 1 to 20 mol percent of a cycloaliphatic dicarboxylic acid, wherein the total mol percent of all components is 100% and
    (III) a substantially transparent film of adherable polyvinyl fluoride, an adherable side of which is directly bonded to said print sheet member by means of said adhesive mixture.

2. A unitary, heat- and pressure-consolidated, weather-resistant decorative laminated article which comprises:
    (I) a rigidity-imparting base member,
    (II) a print sheet member, bonded to said base member, impregnated throughout with a substantially completely cured aminotriazine-aldehyde resin, and coated with a substantially completely cured composition which, in its uncured state, is a curable, adhesive polyester resin comprising the esterification product of
        (A) from about 34 to 49 mol percent of a cycloaliphatic dihydric alcohol,
        (B) from about 1 to 16 mol percent of an asymmetrical, linear aliphatic dihydric alcohol,
        (C) from about 30 to 49 mol percent of an $\alpha,\beta$-ethylenically unsaturated dicarboxylic acid selected from the group consisting of fumaric acid and itaconic acid, and
        (D) from about 1 to 20 mol percent of a cycloaliphatic dicarboxylic acid, wherein the total mol percent of all components is 100%, and
    (III) a substantially transparent film of adherable polyvinyl fluoride, an adherable side of which is directly bonded to said print sheet member by means of said adhesive mixture.

3. A unitary, heat- and pressure-consolidated, weather-resistant decorative laminated article which comprises:
    (I) a rigidity-imparting base member,
    (II) a print sheet member, bonded to said base member, impregnated throughout with a substantially completely cured melamine-formaldehyde resin, and coated with a substantially completely cured composition which, in its uncured state, is a curable, adhesive polyester resin comprising the esterification product of
        (A) from about 34 to 49 mol percent of a cycloaliphatic dihydric alcohol,
        (B) from about 1 to 16 mol percent of an asymmetrical, linear aliphatic dihydric alcohol,
        (C) from about 30 to 49 mol percent of an $\alpha,\beta$-ethylenically unsaturated dicarboxylic acid selected from the group consisting of fumaric acid and itaconic acid, and
        (D) from about 1 to 20 mol percent of a cycloaliphatic dicarboxylic acid, wherein the total mol percent of all components is 100%, and (III) a substantially transparent film of adherable polyvinyl fluoride, an adherable side of which is directly bonded to said print sheet member by means of said adhesive mixture.

4. The laminated article of claim 1 wherein the components of the adhesive polyester resin are
   (A) a cycloaliphatic dihydric alcohol selected from the group consisting of 1,4-cyclohexane dimethanol, cyclohexanediol-1,4, and 2,2-propylidine bis parahydroxy cyclohexane,
   (B) 1,3-butylene glycol,
   (C) fumaric acid, and
   (D) hexahydrophthalic acid.

5. The laminated article of claim 2 wherein the components of the adhesive polyester resin are
   (A) a cycloaliphatic dihydric alcohol selected from the group consisting of 1,4-cyclohexane dimethanol, cyclohexane-diol-1,4, and 2,2-propylidine bis parahydroxy cyclohexane,
   (B) 1,3-butylene glycol,
   (C) fumaric acid, and
   (D) hexadrophthalic acid.

6. The laminated article of claim 3 wherein components of the adhesive polyester resin are
   (A) a cycloaliphatic dihydric alcohol selected from the group consisting of 1,4-cyclohexane dimethanol, cyclohexane-diol-1,4, and 2,2-propylidine bis parahydroxy cyclohexane,
   (B) 1,3-butylene glycol,
   (C) fumaric acid, and
   (D) hexahydrophathalic acid.

7. A process for preparing a unitary, weather-resistant, decorative laminated article which comprises:
   (I) coating a print sheet member with a curable, adhesive polyester resin, dissolved in an organic solvent, comprising the esterfication product of
      (A) from about 34 to 49 mol percent of a cycloaliphatic dihydric alcohol,
      (B) from about 1 to 16 mol percent of an asymmetrical, linear aliphatic dihydric alcohol,
      (C) from about 30 to 49 mol percent of an α,β-ethylenically unsaturated dicarboxylic acid selected from the group consisting of fumaric acid and itaconic acid, and
      (D) from about 1 to 20 mol percent of a cycloaliphatic dicarboxylic acid, wherein the total mol percent of all polyester components is 100%,
   (II) overlaying said print sheet member with a substantially transparent film of adherable polyvinyl fluoride, an adherable side of said polyvinyl fluoride film facing said print sheet member, and
   (III) heat- and pressure-consolidating the entire assembly with a rigidity-imparting base member.

8. The process of claim 7 wherein the components of the adhesive polyester resin are
   (A) a cycloaliphatic dihydric alcohol selected from the group consisting of 1,4-cyclohexane dimethanol, cyclohexane-diol-1,4, and 2,2-propylidine bis parahydroxy cyclohexane,
   (B) 1,3-butylene glycol,
   (C) fumaric acid, and
   (D) hexadrophthalic acid.

References Cited by the Examiner

UNITED STATES PATENTS

| | | | |
|---|---|---|---|
| 3,131,116 | 4/1964 | Pounds | 161—258 |
| 3,218,225 | 11/1965 | Petropoulos | 161—248 |
| 3,228,823 | 1/1966 | Usala et al. | 161—186 |
| 3,257,266 | 6/1966 | Sapper | 161—188 |

EARL M. BERGERT, *Primary Examiner.*

H. ANSHER, *Assistant Examiner.*